(12) United States Patent
Dwyer et al.

(10) Patent No.: US 10,584,926 B1
(45) Date of Patent: Mar. 10, 2020

(54) SYSTEM AND METHOD FOR COOLING USING A HEAT EXCHANGER HAVING A MEMBRANE

(71) Applicant: National Technology & Engineering Solutions of Sandia, LLC, Albuquerque, NM (US)

(72) Inventors: Brian P. Dwyer, Albuquerque, NM (US); Charles P. Morrow, Albuquerque, NM (US); Phillip I. Pohl, Albuquerque, NM (US); Laura Biedermann, Albuquerque, NM (US); Paul Crozier, Tijeras, NM (US); Kevin R. Zavadil, Bernalillo, NM (US); Frederick J. Glasscott, West Chester, PA (US)

(73) Assignees: National Technology & Engineering Solutions of Sandia, LLC, Albuquerque, NM (US); Frederick J. Glasscott, West Chester, PA (US)

( * ) Notice: Subject to any disclaimer, the term of this patent is extended or adjusted under 35 U.S.C. 154(b) by 0 days.

(21) Appl. No.: 14/134,160

(22) Filed: Dec. 19, 2013

(51) Int. Cl.
*F28F 21/02* (2006.01)

(52) U.S. Cl.
CPC .................... *F28F 21/02* (2013.01)

(58) Field of Classification Search
CPC . B01D 53/228; B01D 71/021; B01D 67/0062
USPC ................ 210/650, 500.21–500.27; 216/56
See application file for complete search history.

(56) References Cited

U.S. PATENT DOCUMENTS

| | | | |
|---|---|---|---|
| 6,913,627 | B2 | 7/2005 | Matsuda |
| 7,108,917 | B2 | 9/2006 | Klug |
| 7,241,409 | B2 | 7/2007 | Calarco et al. |
| 7,361,197 | B2 | 4/2008 | Winfrey |
| 7,370,896 | B2 | 5/2008 | Anderson et al. |
| 7,469,885 | B2 | 12/2008 | Englund et al. |
| 8,100,451 | B2 | 1/2012 | Okuda et al. |
| 8,147,599 | B2 | 4/2012 | McAlister |
| 8,276,957 | B2 | 10/2012 | Shibamoto et al. |
| 2010/0259057 | A1 | 10/2010 | Madhani |
| 2010/0300946 | A1* | 12/2010 | Nguyen ............... A23L 2/08 210/149 |

(Continued)

FOREIGN PATENT DOCUMENTS

| CN | 1962467 | * | 5/2007 | ............ C02F 1/04 |
|---|---|---|---|---|
| CN | 102827386 A | * | 12/2012 | |

(Continued)

OTHER PUBLICATIONS

"Enabling Graphene Oxide Nanosheets as Water Separation Membranes" by Hu.*

(Continued)

*Primary Examiner* — Krishnan S Menon
*Assistant Examiner* — Waqaas Ali
(74) *Attorney, Agent, or Firm* — Daniel J. Jenkins (57) ABSTRACT

A heat exchanger that includes a membrane of graphene oxide is disclosed, as is a heat exchange system employing such a heat exchanger. The heat exchanger permits the use of water from non-traditional sources, such as waste water, brackish and sea water, in a cooling loop. Clean water and sensible heat permeate through the membrane, simultaneously cooling and purifying water in the cooling loop.

15 Claims, 4 Drawing Sheets

(56) References Cited

U.S. PATENT DOCUMENTS

| | | | |
|---|---|---|---|
| 2011/0017008 A1 | | 1/2011 | Kanayama |
| 2011/0068593 A1 | | 3/2011 | Meusel et al. |
| 2013/0190449 A1 | * | 7/2013 | Kinloch ................ B82Y 30/00 525/50 |
| 2013/0270188 A1 | * | 10/2013 | Karnik et al. ............... 210/650 |
| 2014/0318373 A1 | * | 10/2014 | Wood et al. ................ 210/180 |
| 2015/0090647 A1 | * | 4/2015 | Duke ................ B01D 61/368 210/181 |

FOREIGN PATENT DOCUMENTS

| | | | | |
|---|---|---|---|---|
| EP | 2606953 A1 | * | 6/2013 | ......... B01D 2311/06 |
| WO | WO2014051377 | * | 4/2014 | ............ B01D 69/12 |

OTHER PUBLICATIONS

Guo, Graphene-Based Environmental Barriers, Jul. 17, 2012.*

Nair, Unimpeded Permeation of Water Through Helium-Leak-Tight Graphene-Based Membranes, Jan. 27, 2012.*

Y. Han, et al., "Ultrathin Graphene Nanofiltration Membrane for Water Purification", Advanced Functional Materials, 2013, pp. 1-10.

M. Hu and B. Mi, "Enabling Graphene Oxide Nanosheets As Water Separation Membranes", Environmental Science & Technology, pubs.acs.org/est, 2013, pp. 3715-3723.

R.R. Nair, et al., "Unimpeded Permeation of Water Through Helium-Leak-Tight-Graphene-Based Membranes", Science 335, 442, 2012, pp. 442-444.

C. Xu, et al., "Graphene Oxice-TiO2 Composite Filtration Membranes and Their Potential Application for Water Purification", SciVerse ScienceDiet, www.sciencedirect.com, 2013, 7 pgs.

A. Ambrosi, et al., "Large-Scale Quantification of CVD Graphene Surface Coverage", Nanoscale, 2013, pp. 2379-2387.

K. Putz, et al., "Evolution of Order During Vacuum-Assisted Self-Assembly of Graphene Oxide Paper and Associated Polymer Nanocomposites", ACS Nano, www.acsnano.org, 2011, pp. 6601-6609.

G.J. Stiegel, et al., "Power Plant Water Usage and Loss Study", The United States Department of Energy National Energy Technology Laboratory, Aug. 2005, 104 pages.

D. Boukhvalov, et al. "Origin of Anomalous Water Permeation Through Graphene Oxide Membrane," Nano Lett 2013, 13, 3930-3935.

* cited by examiner

SYSTEM AND METHOD FOR COOLING USING A HEAT EXCHANGER HAVING A MEMBRANE

This invention was developed under Contract No. DE-AC04-94AL85000 between Sandia Corporation and the U.S. Department of Energy. The Government has certain rights in this invention.

FIELD

The present invention relates generally to methods and systems for heat exchange, and, more particularly, to a system and method for cooling using a heat exchanger having a membrane.

BACKGROUND OF THE INVENTION

Thermoelectric generation relies on a fuel source (fossil, nuclear, or biomass) to heat water to steam in a boiler that drives a turbine that then turns a generator creating electricity. Generally there are a series of turbines utilizing the steam energy. The remaining steam, having energy too low to drive another turbine, must be cooled to condense back to water where it is recycled back to the boiler to repeat the process. The condensation of the steam is accomplished in tube and shell heat exchangers also known as condensers. The steam is condensed on the shell side by the flow of cooling water through tubes bundled inside the condenser. As the steam cools, the latent energy is transferred to the cooling water which is circulated to cooling towers. The heated water is then allowed to cascade downward on an open air medium where fresh dry air is passed across the medium. The dry air becomes more humid and evaporates, thereby removing the residual heat from the system.

This condensing process results in huge water and energy losses. Approximately sixty percent of the energy in a coal fired power plant originally developed at the boiler is wasted in the form of evaporation in the process of condensing low grade steam. Power plants are always attempting to lessen these losses.

The National Energy Technology Lab (NETL) completed a study in 2007 based on a normalized comparison of seven fossil fuel power plant designs. For each plant, heat and material balances were prepared on a common basis with emphasis on Water Usage and Water Loss, where Water Usage was the raw metered water from external sources and used in the power plant for any and all purposes and Water Loss was the water exiting the system and that represents the overall "loss" of water to the environment.

According to this basis, Water Loss is greater than Water Usage because water enters the system in the fuel and from ambient air (combustion processes liberate water). Eighty to ninety-nine percent of the power plant raw water usage was through a combination of cooling tower evaporation and blowdown.

It is desirable to decrease water consumption in power plants, particularly in light of ever increasing demand on limited fresh water. As populations grow so does the need for energy and fresh water. A problem is that creating energy requires large amounts of fresh water, so even incremental improvements in lowering the water requirements for energy production are needed.

Accordingly, what is needed is a way to reduce water requirements in steam generation and other industrial processes in a more energy efficient manner.

SUMMARY

According to an exemplary embodiment of the invention, a heat exchanger is disclosed that includes a membrane formed of graphene oxide.

According to another exemplary embodiment of the invention, heat exchange systems employing such heat exchangers are disclosed.

Heat exchangers in accordance with exemplary embodiments permit the use of water from non-traditional sources, such as waste water, brackish and sea water, in a cooling loop. Non-traditional cold water selectively permeates through the membrane at or near distilled quality, purifying the water in the cooling loop by reducing the salt concentration. The non-traditional cooling water is cooled as sensible heat passes through the membrane into the cold non-traditional water source.

According to another exemplary embodiment of the invention, the heat exchanger is used in a steam generation facility and a method for operating a steam generation facility is disclosed that includes generating steam in a first heat exchange loop comprising a closed steam condensation loop, condensing low pressure steam in a condenser via a heat exchange fluid flowing through a second heat exchange loop comprising a cooling water loop, passing the heat exchange fluid in the cooling water loop through a heat exchanger comprising a graphene oxide membrane and drawing fluid and sensible heat from the cooling water loop to a third heat exchange loop via a second fluid heat exchange fluid passing through the heat exchanger.

Exemplary embodiments of the invention allow for the use of non-traditional water sources as heat exchange fluids instead of fresh water, thereby reducing fresh water demand and costs associated with its production.

Exemplary embodiments result in fresh water production from the non-traditional water source in addition to its use as a heat exchange fluid, so that the resulting fresh water can be used in other applications.

Exemplary embodiments also allow excess energy production capacity to be used for the production of clean water, a high value product.

Furthermore, the clean water produced is at or near distilled quality, requiring no additional treatment for further use within a facility.

Other features and advantages of the present invention will be apparent from the following more detailed description of exemplary embodiments, taken in conjunction with the accompanying drawings which illustrate, by way of example, the principles of the invention.

DESCRIPTION OF THE DRAWINGS

Where like parts appear in more than one drawing, it has been attempted to use like reference numerals for clarity.

DETAILED DESCRIPTION OF THE INVENTION

Exemplary embodiments are directed to systems and methods for cooling using a heat exchanger having a membrane of graphene oxide that permits the use of non-traditional (i.e. "dirty") water sources as a heat exchange fluid. While the present disclosure is described primarily with respect to those methods and systems in the condensation of steam in a closed loop power plant cycle of a coal fired power plant, it will be appreciated that the invention is not so limited and that other applications are also contemplated. For example, exemplary embodiments may be readily and advantageously employed in nuclear powered and natural gas powered electrical generating facilities, chemical manufacture, and refining industries, or anywhere else waste heat is available and water usage is high and/or that makes use of heat exchange/condenser units.

Figure 1:
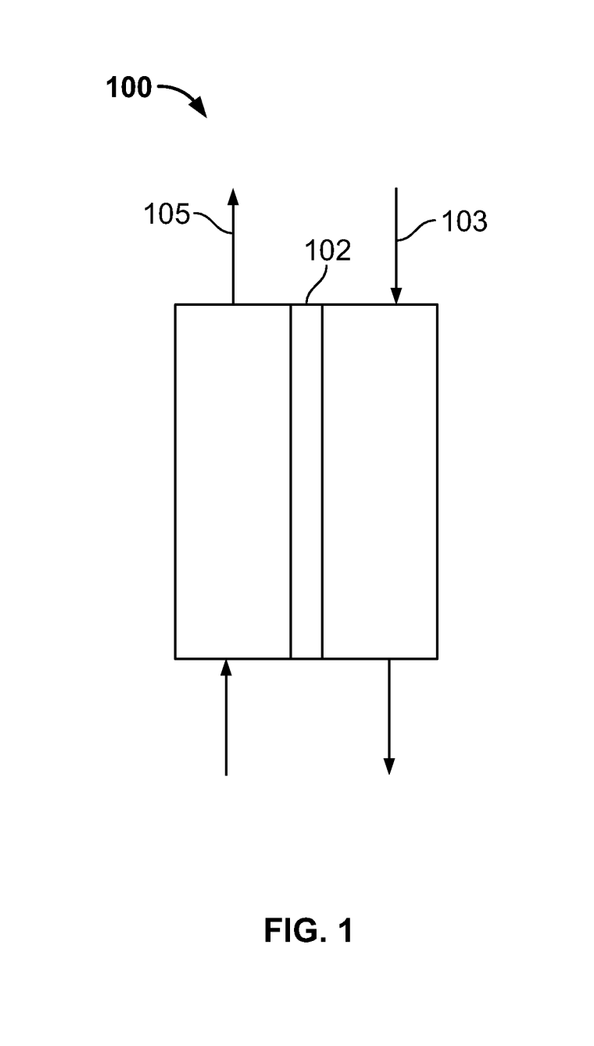
FIG. 1 schematically illustrates a heat exchanger in accordance with an exemplary embodiment.

Turning to FIG. 1, a heat exchanger 100 in accordance with an exemplary embodiment is schematically illustrated. The heat exchanger 100 contains a membrane 102 that comprises a graphene oxide membrane In an embodiment, a graphene oxide membrane may be supported by a porous support membrane or supported between two porous support membranes.

The graphene oxide membrane is formed of two or more layers of graphene oxide, wherein each layer is formed of a plurality of graphene oxide flakes. The interlayer spacing in the graphene oxide is between about 0.7 nm and 1.1 nm, with the lower range corresponding to dehydrated conditions and the upper range hydrated conditions. Water flows through a permeation pathway existing within this interlayer spacing. The water flow is between and around the layered graphene oxide flakes comprising the membrane. The graphene oxide membrane is described in co-pending application number U.S. application Ser. No. 14/134,086 filed on Dec. 19, 2013, which is hereby incorporated by reference in its entirety. The graphene oxide membrane is discussed in further detail below.

The porous support membrane and graphene oxide membrane may be joined by inter-membrane chemical cross-linking agents (as described below) or the graphene oxide membrane may be held to support membrane(s) via van der Waals attraction. In some embodiments, inter-membrane cross-linking of a porous support membrane with the graphene oxide membrane promotes adhesion of the entire filtration membrane assembly. Potential inter-membrane cross-linking agents include silane coupling agents such as 3-aminopropyltroethoxysilane or 3-(triethoxysilyl)propyl isocyanate, epoxides, and diazonium compounds. The inter-membrane cross-linking agents are selected to covalently bind to the support membrane and oxygen functional groups on the graphene oxide basal plane of graphene oxide membrane. Such inter-membrane cross-linking agents could either be applied to the support membrane prior to assembly or transfer of the graphene oxide membrane or they could be initially bonded to the first few (1-10) layers of the graphene oxide and then bonded to the support membrane during the assembly of the graphene oxide membrane. To enhance the binding of cross-linking agents to the support membrane, the support membrane may be pre-treated with exposure to plasma, UV/ozone, or UV irradiation to increase the density of oxygen binding groups.

First and second heat exchange fluids 103 and 105 having a temperature differential flow through opposite sides of the heat exchanger 100 in a counter current or concurrent manner, depending upon the particular construction of the heat exchanger employed. Thus, as a hotter first heat exchange fluid 103 flows through a first side of the heat exchanger 100, the heat passes through the membrane 102 to a second, cooler heat exchange fluid 105 flowing through a second side of the heat exchanger.

In some embodiments, the heat exchanger 100 is a shell and tube heat exchanger. Heat is transferred from one fluid to the other through the tube walls, either from tube side to shell side or vice versa. Other potential heat exchanger assemblies include plate and frame heat exchangers which use metal plates to transfer heat between two fluids and fin-fan heat exchangers which use air to assist with cooling a fluid.

In one embodiment, the first heat exchange fluid 103 is "dirty" water, i.e., water from a non-traditional water source such as waste water, brackish, or seawater. Waste water sources include grey water, post-industrial process water, production water from oil and gas drilling operations, mining water, or any other source having a salt or other dissolved solid content above that generally considered acceptable for re-use. The second heat exchange fluid 105 may be any suitable fluid including air or a fresh water source. In some embodiments, the second heat exchange fluid 105 may flow through the heat exchanger 100 on its way to or from another location within the power plant.

The heated "dirty" water transfers the waste heat energy in the form of clean heated water across the membrane 102 to the cold side where the heated clean water condenses in the cold stream. The membrane 102 comprises graphene oxide. The membrane 102 removes contaminants from the dirty water (i.e. first heat exchange fluid 103) allowing only clean water to pass. The use of a graphene oxide membrane 102 employs the difference in vapor pressure of water across a membrane rather than total pressure as the driving force for contaminant removal. Regardless if water vapor or liquid water exists on the feed side of the graphene oxide membrane 102, water flow through the graphene oxide membrane is governed by the Hagen-Pousille equation for the flow of liquids in a confined geometry. Unlike in membrane distillation, in which the driving pressure is the difference in vapor pressure across the membrane (≤23 mbar at standard atmospheric conditions), the driving pressure for water flow through a graphene oxide membrane is on the order of $10^3$-$10^4$ bar. This factor of $10^7$ enhancement in driving pressure is due to the strong capillary interactions of the water molecules with the graphene oxide sheets.

Thus, in an embodiment the dirty water heated by low grade waste heat in a condenser flows on one side of the membrane 102 while on the other side is counter flowing, cool clean water. Water vapor from the heated side passes through the membrane 102 due to the higher vapor pressure on the hot side. Vapor is then condensed in the cool clean stream.

A variety of different configurations for the heat exchanger 100 are contemplated. In one embodiment, direct contact is employed in which the cooler stream of the second heat exchange fluid 105 (i.e. air or cool, clean water) flows counter to the stream of the heated first heat exchange fluid 103 (i.e. dirty water) in direct contact with the membrane 102. In another embodiment, a sweep gas may be employed to pull water vapor out of the system, which may be useful when volatiles are in the first heat exchange fluid 103. In another embodiment, an air gap is between the membrane and the cooler surface of the second heat exchange fluid 105. In yet another embodiment, a vacuum is used to pull clean water vapor out of the system. This is also useful when volatiles exist in the dirty water.

The graphene oxide of the membrane 102 is constructed of a plurality of coarsely parallel sheets/layers of graphene oxide flakes overlying one another. Oxygen functional groups on the basal plane of the graphene oxide layers act as nanopillars, resulting in a layer spacing between 0.7 and 1.1 nm. This layer spacing is dependent on the environment of the GO membrane. In a fully dehydrated condition, the layer spacing decreases to 0.7 nm; in a fully hydrated condition, the layer spacing increases to 1.1 nm. The widest portion of the permeation pathways is between two graphitic (i.e. unfunctionalized) regions of two parallel GO flakes. The height of the permeation pathway in such a graphitic region is approximately the layer spacing minus the thickness of an individual graphene sheet (0.335 nm). This permeation pathway height is sufficient to allow one to two monolayers of water to permeate between the GO flakes. Additionally, the permeation pathway height is the narrow barrier limiting the permeation of solvated ions. Furthermore, the narrow permeation pathway produces strong capillary interactions that drive a high water flux through the graphene oxide membrane 102, and which is effective in the transfer of heat to the second heat exchange fluid.

Flux is dependent on the physical properties of the membrane and external driving forces. Decreasing the membrane thickness and increasing the layer spacing increases the flux, though the tradeoffs are decreasing membrane robustness and ion rejection. External driving forces for the water flux include the pressure drop across the membrane and the vapor pressure differential across the membrane. Strong capillary interactions are the dominant internal driving force for water permeation, whether the external feed water is liquid or vapor. The strong capillary interactions of the water molecules with the graphitic (unoxidized) portions of the graphene oxide flakes result in a capillary driving pressure many orders of magnitude greater than the pressure drop or vapor pressure differential, resulting in a greater efficiency compared to traditional membrane distillation or reverse osmosis processes. Furthermore, the small permeation pathway height produces strong capillary interactions that drive a high water flux through the GO membrane 205 such that the permeation rate for water vapor is ultimately limited by the evaporation rate of water on the permeate side of the GO membrane 205. Similar to in membrane distillation, employing a sweep gas or vacuum enhancement on the permeate side may enhance water evaporation and thus flux. According to an exemplary embodiment of the invention, flux through the GO membrane 205 is 0.25 $L/m^2/hr$ or greater for water vapor evaporating through it, and 5 $L/m^2/hr$ or greater for liquid water passing through it. In the GO membrane, strong capillary force is the driving force, rather than vapor pressure, resulting in a greater efficiency compared to traditional membrane distillation processes.

The graphene oxide membrane 102 is typically not self-standing, but is rather assembled on an appropriate porous support material for the type of permeation (water vapor or liquid water), volume of permeate, and use in the power plant. For the case of water vapor permeation, a flat plane geometry may be used. Macroporous metal films or ceramic structures (e.g., anodized alumina) provide a rigid, high-flux, chemically resistant support with high or low thermal conductivity, respectively. For the case of liquid water permeation, a spiral-wound membrane geometry maximizes the density of the membrane area. In this case, a flexible polymeric membrane support such as that used in multilayer reverse osmosis membranes may be used. Exemplary resistant support materials for use in the membrane 102 include polysulfone, polyethersulfone, and cellulose, although other suitable materials within the membrane art may also be used. The membrane 102 could also be used in flat plane and other geometries.

Graphene oxide, having already been oxidized, is also generally resistant to chlorine, meaning dilute solutions of HCl, bleach (sodium hypochlorite) and other disinfectants can be employed at levels sufficient to prevent biofouling of the membrane without significant degradation of the membrane 102. Oxidation resistant materials may used as the support structure.

Figure 2:
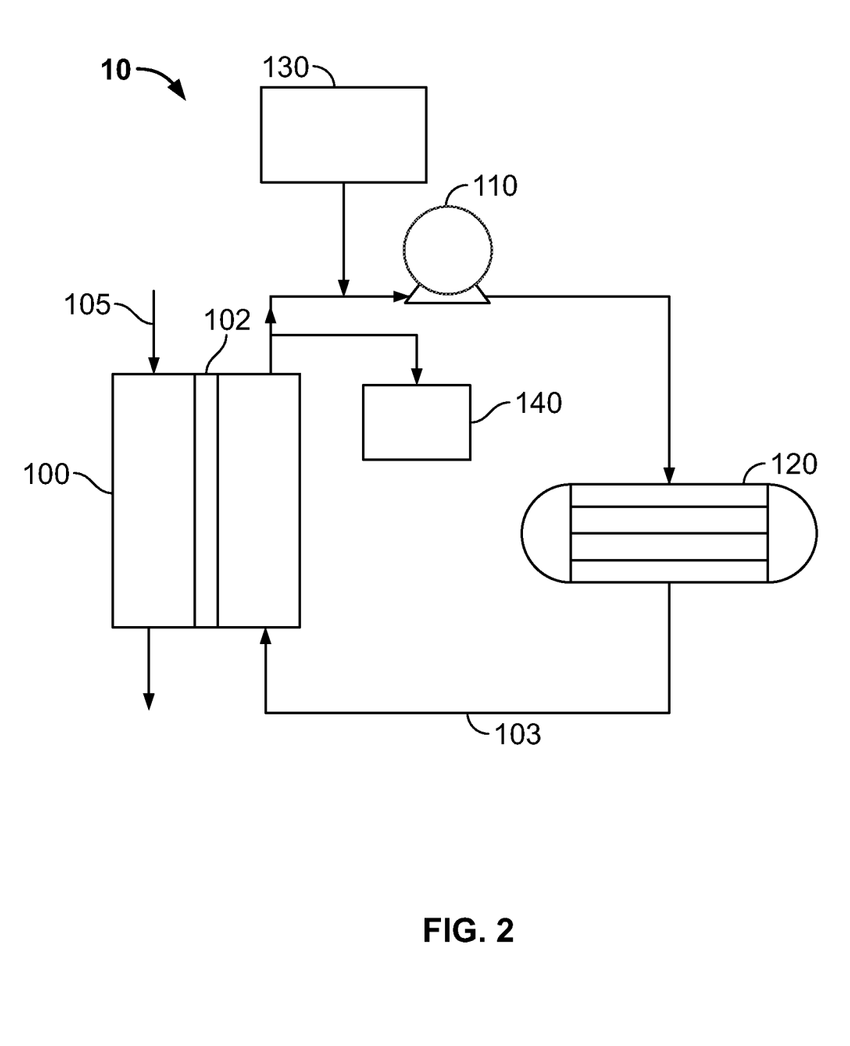
FIG. 2 schematically illustrates a cooling water loop of a heat exchange system in accordance with an exemplary embodiment.

FIG. 2 illustrates the heat exchanger 100 as part of a closed cooling loop 10, in this case a cooling water loop that employs a condenser 120. Dirty water as the first heat exchange fluid 103 in the cooling water loop 10 is pumped by pump 110 through a heat exchanger, such as the condenser 120, where heat is transferred to the dirty water from the condensing steam. The now heated dirty water passes back to the heat exchanger 100 where heat is expelled through the graphene oxide membrane 102 as clean, hot water. As noted, the graphene oxide also acts as a filter.

Accordingly, as the dirty water flows through the heat exchanger 100, water molecules, but not the impurities, permeate through the membrane 102. Thus, sensible heat is removed from the cooling water loop 10 via the now purified fresh water exiting the graphene oxide membrane 102. The clean water passing through the membrane 102 may enter the opposite stream as a vapor or as liquid water. The graphene oxide membrane 102 has a high water flux (0.25 $L/m^2/hr$ or greater), allowing the water and sensible heat in that water to be drawn into the cooling stream at a rate sufficient to cool the dirty water stream to an appropriate temperature to be cycled back to the condenser 120 via the pump 110.

Because water is lost from the cooling stream as it passes through the system, a dirty water make-up source 130 is connected to the cooling water loop 10 to introduce new waste water into that loop 10. Depending upon the temperature of the incoming dirty water, this may further cool the dirty water exiting the heat exchanger 100 to the desired entering temperature at the condenser 120. In some embodiments a portion of the cooled, dirty water exiting the heat exchanger 100, now having a more concentrated level of impurities as a result of the distillation through the membrane 102, may be directed to a blowdown outlet 140 for processing as waste.

Figure 3:
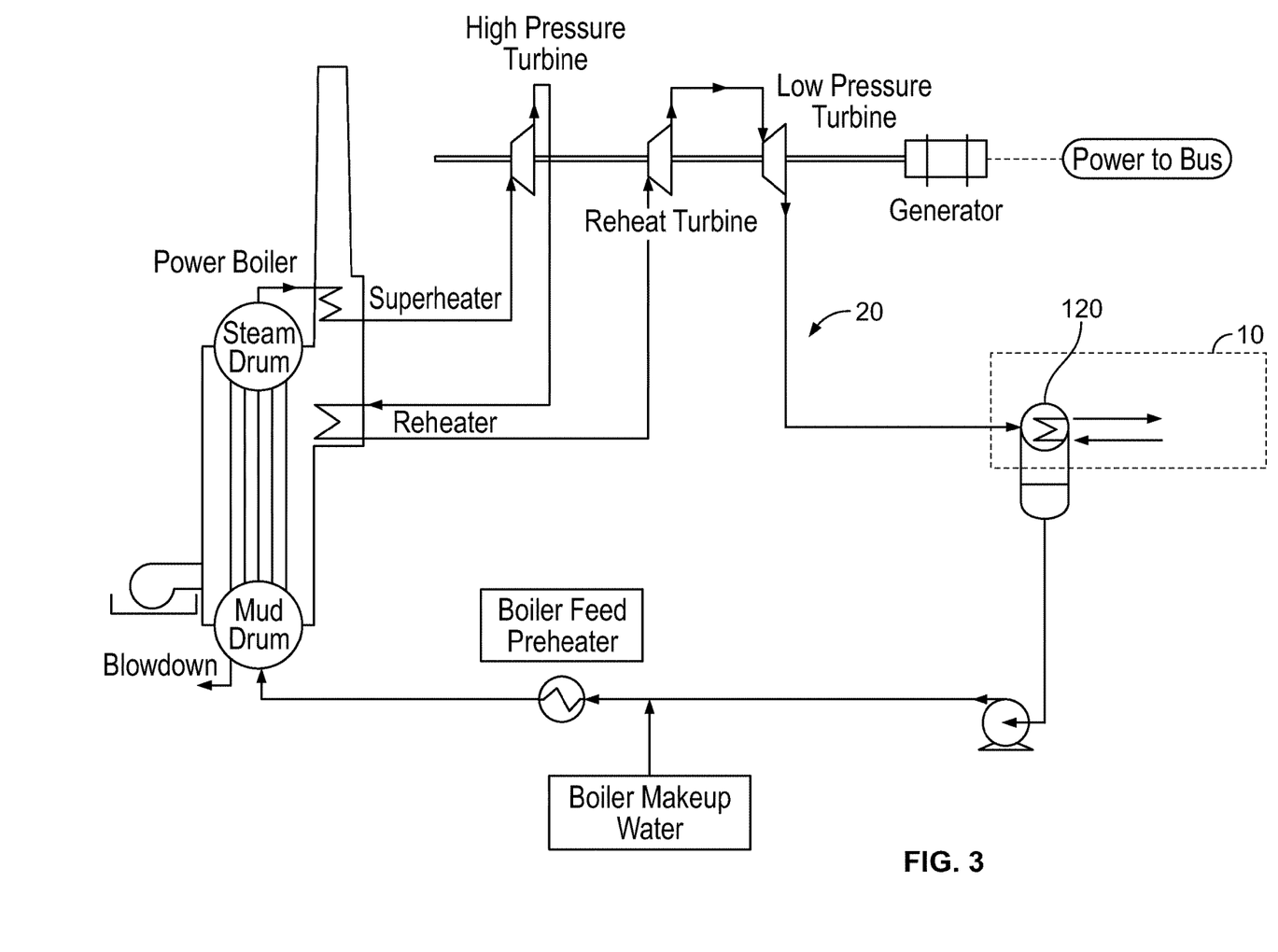
FIG. 3 schematically illustrates a portion of the cooling water loop of FIG. 2 in thermal communication with a simplified Rankine Cycle power plant.

Turning to FIG. 3, the condenser 120 may be a surface condenser having a tube and shell configuration and which links the cooling water loop 10 with a thermal power plant that has its own closed cooling loop in the form of a steam generation loop 20 (hereafter referred to as a steam condensation loop from the point of view of the heat exchange systems discussed herein). FIG. 3 schematically illustrates the closed cooling loop 20 as a simplified Rankine Cycle in thermal communication with the cooling water loop 10 (partially shown in FIG. 3). The primary purpose of the surface condenser 120 in the steam condensation loop 20 is to condense low pressure exhaust steam exiting one or more steam turbines to obtain maximum efficiency and also to convert the turbine exhaust steam into pure water (referred to as steam condensate) so that it may be reused in the steam generator or boiler as boiler feed water. Low grade steam, which may not have enough energy to further drive a turbine, is sent to the condenser 120 where heat from the steam is removed by circulating the dirty water in the cooling water loop 10. The condensed steam is passed back through a boiler feed preheater where makeup water is typically added as a result of system losses, from which it is passed back to the boiler, generating steam for use in powering a generator in a conventional manner.

Figure 4:
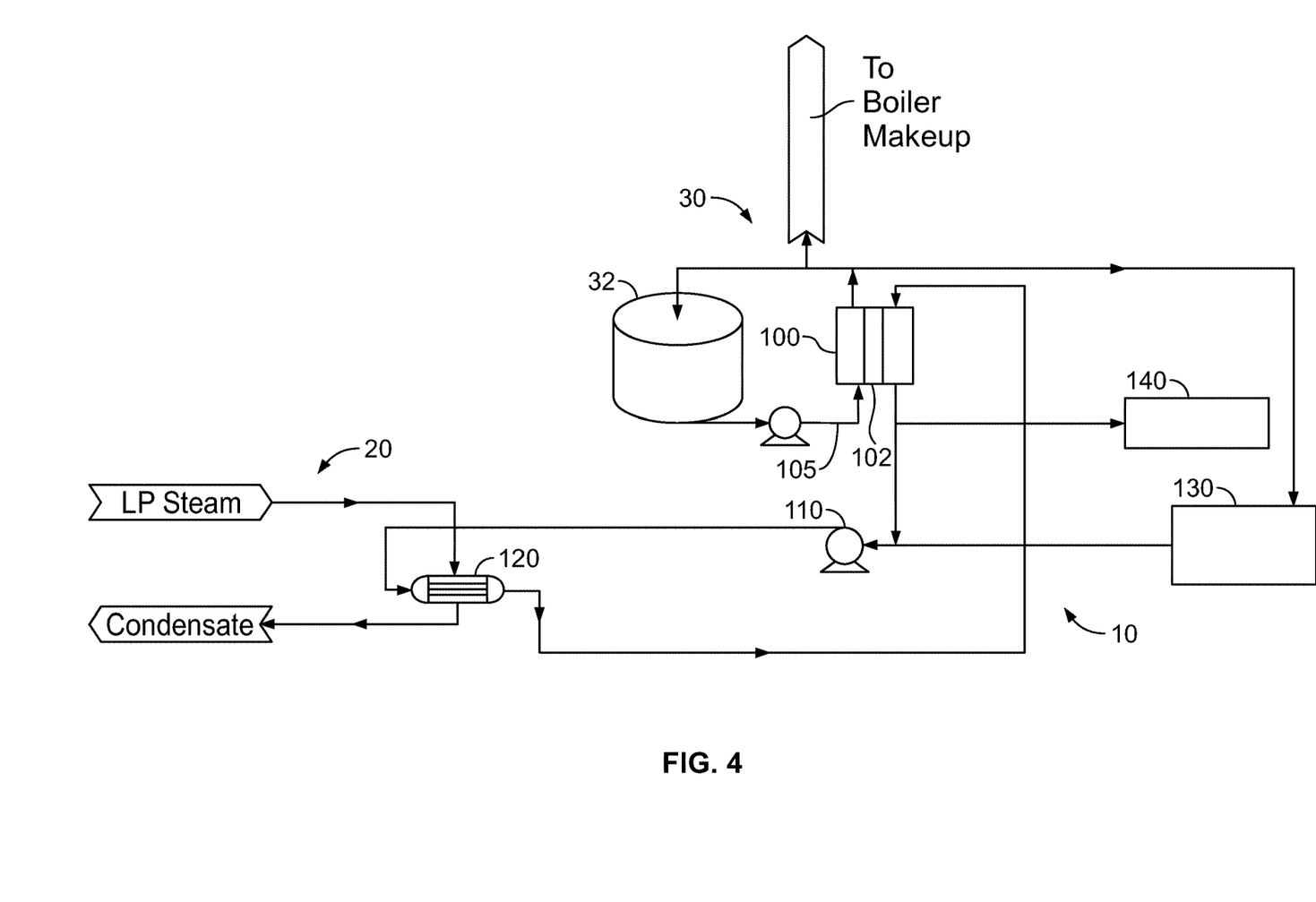
FIG. 4 schematically illustrates a heat exchange system in accordance with an embodiment of the invention.

FIG. 4 shows a schematic of a heat exchange system in which the steam condensation loop 20 (partially shown at the condenser 120) is in thermal communication with the cooling water loop 10 in which the heat expelled from it via the heat exchanger 100 is absorbed by a heat exchange fluid 105 flowing through the opposite side and that itself is part of another closed cooling loop 30. That is, the heat exchange system of FIG. 4 has three closed cooling loops: the steam condensation loop 20; the cooling water loop 10; and the third cooling loop 30 passing through the opposite side of the heat exchanger 105. The third cooling loop 30 is a cool, clean water loop that draws suction from a cool clean water makeup tank 32 or other source of cool clean water. The third cooling loop 30 acts to cool (or condense) the relatively hot clean water (or water vapor) that has passed across the graphene oxide of the membrane 102 in the heat exchanger 100. That process also involves the production of clean water introduced into the third cooling loop 30. Some of the water from the third cooling loop 30, the volume of which is expanded by the addition of the produced water, can be cycled back to the makeup tank 32 for further cooling use, directed to the boiler in the steam condensation loop 20 as a boiler makeup source, added back to the cooling water loop 10 to dilute impurities, used for other purposes internal or external to the heat exchange system and/or industrial facility, or be sold on the open market.

Figure 5:
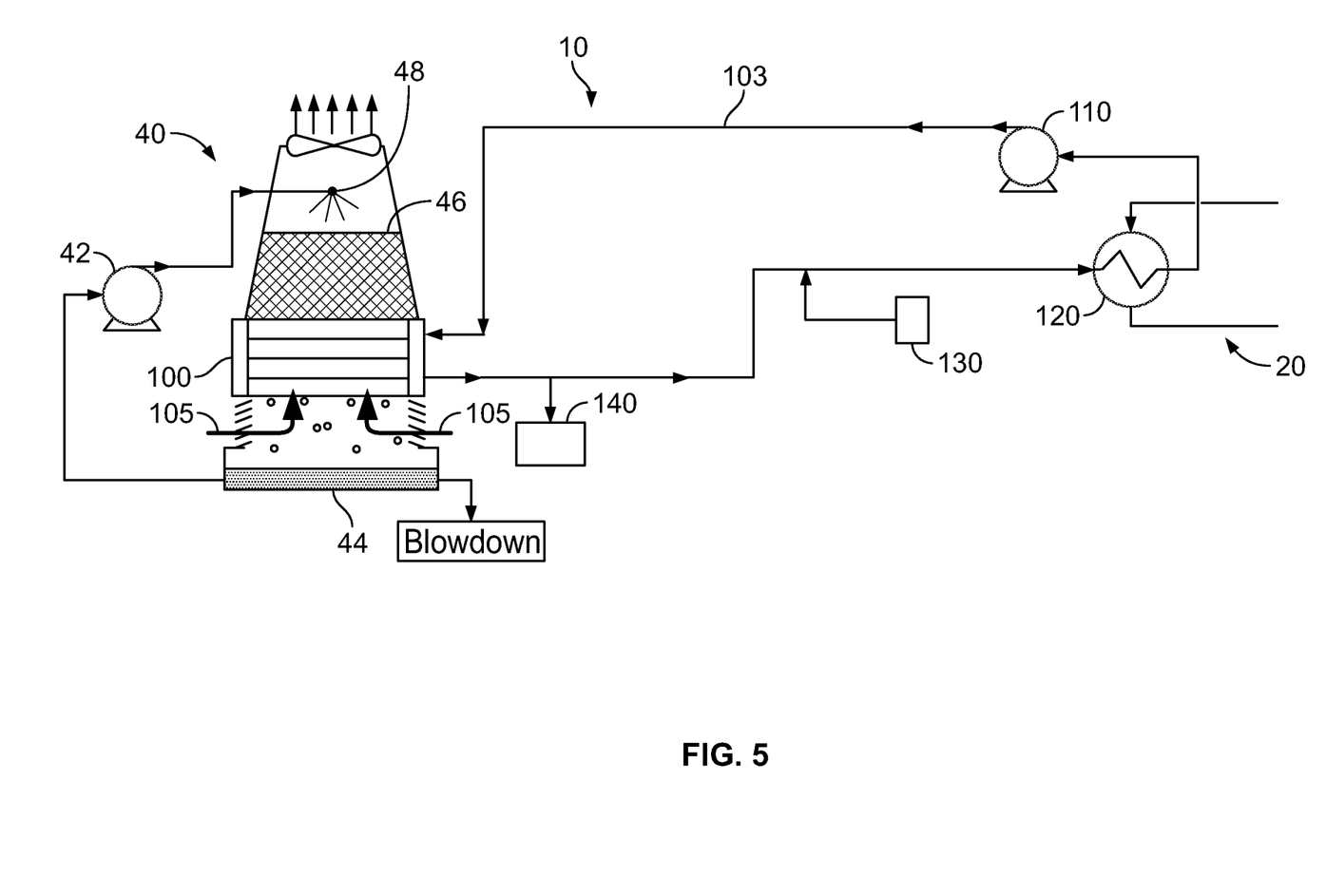
FIG. 5 schematically illustrates a heat exchange system in accordance with another embodiment of the invention.

According to another embodiment, partial or full replacement of cooling towers with a graphene oxide membrane configuration is accomplished. Turning to FIG. 5, in an embodiment, evaporative cooling is used with the graphene oxide membrane-containing heat exchanger 100 integrated into a combination cooling tower 40. In this embodiment, the heat exchanger 100 is constructed as a fin-fin or other suitable configuration of heat exchanger in which cooling air is the second heat exchange fluid 105 and passes through the heat exchanger 100 to absorb heat from the dirty water used as the first heat exchange fluid 103. Clean water that permeates from the cooling water loop 10 through the graphene oxide membrane 102 falls into a cold water basin 44. A pump 42 pumps the water from the basin 44 to a sprayer 48 and then falls through structured packing 46 and humidifies the air, which is then expelled to the environment to remove heat from the system via evaporative cooling.

While the majority of water consumed in a power plant employing a conventional design is through condensing the steam via evaporative cooling using expensive and limited fresh water, exemplary embodiments can use non-traditional water sources to be substituted for that clean water. This provides a power plant or other heat exchange system that can use water sources that would have unacceptable water quality for conventional cooling tower operation.

In an embodiment, the treatment of cooling tower loop water with a graphene oxide membrane can be used to increase the cycles of concentration. During cooling tower operation, the conductivity (TDS level) of the cooling tower makeup water is monitored. In a conventional cooling tower, as water is spray evaporated the conductivity increases, i.e., minerals or ions in the makeup water concentrate proportional to the evaporation rate. As the water evaporates the minerals fall back into the makeup water basin, thereby increasing the conductivity. At a pre-determined conductivity a portion of the makeup water is removed (blown down) and replaced with clean (relatively low conductivity) water.

Extending the time between blow down intervals (increasing the Cycles of Concentration) is desirable from a water usage and operational standpoint. Exemplary embodiments, such as that described with respect to FIG. 5, solve this by continuously adding distilled (near zero conductivity) quality water to the cold water basin makeup 44 reservoir significantly increasing the "cycles of concentration".

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A heat exchange system comprising:
   a heat exchanger selected from a shell and tube heat exchanger or a plate and frame heat exchanger;
   a porous support disposed within the heat exchanger; and
   a graphene oxide membrane joined to the porous support within the heat exchanger;
   wherein the graphene oxide membrane consists essentially of graphene oxide flakes forming layers connected by nanopillars of oxygen functional groups, wherein the layers have an interlayer spacing of between about 0.7 nm and 1.1 nm and wherein the graphene oxide membrane has a first side and a second side; and
   wherein the heat exchanger is configured to receive a first heat exchange fluid stream at a first temperature flowing in contact with the first side and a second heat exchange fluid stream at a second temperature flowing in contact with the second side;
   the heat exchange system further comprising a condenser;
   wherein the heat exchanger receives the first heat exchanger fluid stream from a cooling loop the condenser that heats the first heat exchanger fluid stream; and
   wherein the first temperature is greater than the second temperature; and
   wherein the first heat exchange fluid stream comprises water and at least one contaminant: and
   wherein the graphene oxide membrane is capable of allowing water to permeate through the graphene oxide membrane from the first heat exchange fluid stream to add to the second heat exchange fluid stream.

2. The heat exchanger of claim 1, wherein the first heat exchange fluid stream in the heat exchanger comprises waste water, brackish or seawater.

3. The heat exchanger of claim 2, wherein the second heat exchange fluid stream in the heat exchanger comprises fresh water.

4. The heat exchanger of claim 1, wherein the support membrane comprises graphene oxide.

5. The heat exchanger of claim 1, wherein the support membrane is constructed of
   an oxidation resistant material.

6. A heat exchange system comprising:
a heat exchanger selected from a shell and tube heat exchanger or a plate and frame heat exchanger;
the heat exchanger comprising a graphene oxide membrane joined to a porous support, the graphene oxide membrane comprising a first side and a second side;
wherein the graphene oxide membrane consists essentially of graphene oxide flakes forming layers connected by nanopillars of oxygen functional groups, wherein the layers have an interlayer spacing of between about 0.7 nm and 1.1 nm and
wherein the heat exchanger is configured to receive a first heat exchange fluid stream flowing in contact with the first side and a second heat exchange fluid stream flowing in contact with the second side; and
wherein water permeates through the graphene oxide membrane from the first heat exchange fluid stream to add to the second heat exchange fluid stream; and
a first heat exchange fluid steam source, a pump and a condenser in fluid communication with a first side of the heat exchanger;
wherein the condenser is in fluid connectivity with a hot fluid stream that transfers heat to the first heat exchanger fluid stream.

7. The heat exchange system of claim 6, further comprising a second heat exchange fluid source in fluid communication with a second side of the heat exchanger.

8. The heat exchange system of claim 6, wherein the second heat exchange fluid stream is a cooling water loop of a corresponding steam condensation loop.

9. The heat exchange system of claim 8, wherein the water permeating through the graphene oxide membrane of the heat provides makeup water to a boiler in the steam condensation loop.

10. The heat exchange system of claim 8, wherein the second heat exchange fluid stream is formed of a heat exchange fluid selected from a group consisting of waste water, brackish, and seawater.

11. The heat exchange system of claim 6, further comprising two heat exchange loops, wherein a first heat exchange loop is in thermal communication with a second heat exchange loop via a condenser to absorb heat from the first heat exchange loop, the second heat exchange loop comprising the heat exchanger comprising the graphene oxide membrane.

12. The heat exchange system of claim 11, wherein the first heat exchange loop is a closed steam condensation loop and the second heat exchange loop is a cooling water loop comprising waste water, brackish or seawater as a fluid in the second heat exchange loop.

13. The heat exchange system of claim 8 comprising a third heat exchange loop, wherein the second heat exchange loop is in thermal communication with the third heat exchange loop via the heat exchanger comprising the graphene oxide membrane to expel sensible heat to the third heat exchange loop via fresh water passing through the graphene oxide membrane.

14. The heat exchange system of claim 8, wherein the second heat exchange loop expels heat captured from the first heat exchange loop to the environment via a cooling tower, the heat exchanger being integrated into the cooling tower.

15. The heat exchange system of claim 14, wherein the second heat exchange loop is in fluid connectivity to the cooling tower so as to provide fresh water from the second heat exchange loop to the cooling tower.

\* \* \* \* \*